United States Patent
Kawasato et al.

(10) Patent No.: US 10,153,489 B2
(45) Date of Patent: Dec. 11, 2018

(54) LITHIUM-CONTAINING COMPOSITE OXIDE AND PROCESS FOR ITS PRODUCTION

(71) Applicant: SUMITOMO CHEMICAL CO., LTD., Chuo-ku (JP)

(72) Inventors: Takeshi Kawasato, Chiyoda-ku (JP); Masahiko Tamura, Chiyoda-ku (JP); Ryo Eguchi, Chiyoda-ku (JP)

(73) Assignee: SUMITOMO CHEMICAL CO., LTD., Chuo-ku (JP)

( * ) Notice: Subject to any disclaimer, the term of this patent is extended or adjusted under 35 U.S.C. 154(b) by 176 days.

(21) Appl. No.: 14/691,818

(22) Filed: Apr. 21, 2015

(65) Prior Publication Data

US 2015/0380737 A1    Dec. 31, 2015

(30) Foreign Application Priority Data

Jun. 27, 2014    (JP) .................................. 2014-132890
Mar. 31, 2015    (JP) .................................. 2015-072458

(51) Int. Cl.
*H01M 4/00*    (2006.01)
*H01M 4/525*    (2010.01)
(Continued)

(52) U.S. Cl.
CPC ............ *H01M 4/525* (2013.01); *C01G 53/50* (2013.01); *H01M 4/505* (2013.01); *H01M 10/052* (2013.01); *C01P 2002/60* (2013.01); *C01P 2002/74* (2013.01); *C01P 2002/76* (2013.01); *C01P 2002/77* (2013.01); *C01P 2004/61* (2013.01); *C01P 2004/62* (2013.01); *C01P 2006/11* (2013.01); *C01P 2006/12* (2013.01);
(Continued)

(58) Field of Classification Search
CPC ....... H01M 4/485; H01M 4/505; H01M 4/525
See application file for complete search history.

(56) References Cited

U.S. PATENT DOCUMENTS 8,192,715 B2 * 6/2012 Kawasato .............. C01G 51/42
                                                                252/519.1
8,287,828 B2    10/2012 Kawasato et al.
(Continued)

FOREIGN PATENT DOCUMENTS

JP    2004-002141 A    1/2004
JP    2005-044801 A    2/2005
(Continued)

OTHER PUBLICATIONS

Office Action issued Aug. 28, 2018, in Japanese Application No. 2015-072458, filed Mar. 31, 2015.

*Primary Examiner* — Nicholas P D'Aniello
(74) *Attorney, Agent, or Firm* — Oblon, McClelland, Maier & Neustadt, L.L.P.

(57) ABSTRACT

A lithium-containing composite oxide essentially containing Li, Ni, Co and Mn, which has a crystal structure with space group R-3m, with a c-axis lattice constant being from 14.208 to 14.228 Å, and with an a-axis lattice constant and the c-axis lattice constant satisfying the relation of 3a+5.615≤c≤3a+5.655, and of which the integrated intensity ratio ($I_{003}/I_{104}$) of the (003) peak to the (104) peak in an XRD pattern is from 1.21 to 1.39.

9 Claims, 2 Drawing Sheets

(51) Int. Cl.
    *H01M 4/505*     (2010.01)
    *C01G 53/00*     (2006.01)
    *H01M 10/052*     (2010.01)
    *H01M 10/0525*     (2010.01)
    *H01M 4/02*     (2006.01)

(52) U.S. Cl.
    CPC ..... *C01P 2006/40* (2013.01); *H01M 10/0525* (2013.01); *H01M 2004/021* (2013.01); *H01M 2004/028* (2013.01); *Y02T 10/7011* (2013.01)

(56) References Cited

U.S. PATENT DOCUMENTS

| | | | | |
|---|---|---|---|---|
| 8,795,896 | B2 * | 8/2014 | Kawasato | H01M 4/36 429/223 |
| 9,466,829 | B2 * | 10/2016 | Modeki | H01M 4/505 |
| 2009/0258296 | A1 * | 10/2009 | Kawasato | H01M 4/36 429/223 |
| 2014/0110641 | A1 | 4/2014 | Murotani et al. | |
| 2014/0113193 | A1 | 4/2014 | Tsunozaki et al. | |
| 2014/0113194 | A1 | 4/2014 | Tsunozaki et al. | |
| 2014/0154581 | A1 | 6/2014 | Kawasato et al. | |
| 2014/0212758 | A1 | 7/2014 | Kawasato et al. | |

FOREIGN PATENT DOCUMENTS

| | | |
|---|---|---|
| JP | 2007-184145 A | 7/2007 |
| JP | 4740415 | 8/2011 |
| JP | 5231171 | 7/2013 |
| JP | 2013-531602 A | 8/2013 |
| JP | 5359140 | 12/2013 |

* cited by examiner

LITHIUM-CONTAINING COMPOSITE OXIDE AND PROCESS FOR ITS PRODUCTION

FIELD OF INVENTION

The present invention relates to a lithium-containing composite oxide and a process for its production, a positive electrode for a lithium ion secondary battery using the lithium-containing composite oxide, and a lithium ion secondary battery.

BACKGROUND OF INVENTION

A lithium ion secondary battery (hereinafter referred to as LIB) is widely used for portable electronic instruments such as cell phones or notebook-size personal computers. As a cathode material for a LIB, a composite oxide of lithium with e.g. a transition metal (hereinafter referred to as a lithium-containing composite oxide), such as $LiCoO_2$, $LiNiO_2$, $LiNi_{0.8}Co_{0.2}O_2$ or $LiMn_2O_4$, is employed.

In recent years, a LIB started being used for e.g. an electrical power supply for a vehicle. Specifically, a LIB started being used as an electrical power supply for an electric vehicle (EV), a hybrid electric vehicle (HEV) and a plug-in hybrid vehicle (PHEV) driven by a motor and an electrical power supply for idling stop. Further, a LIB for vehicles is required to have higher performance with respect to the capacity, the safety, the output characteristics and the cycle durability as compared with conventional applications.

At present, $LiMn_2O_4$ which started being used as a cathode material for a LIB for vehicles has high output characteristics and safety but has problems in a short cruising distance since the capacity is so low as at a level of 120 mAh/g.

Whereas, a cathode material containing Ni, Co and Mn as transition metals (hereinafter referred to as ternary cathode material) such as $LiNi_{1/3}Co_{1/3}Mn_{1/3}O_2$, $LiNi_{0.4}Co_{0.3}Mn_{0.3}O_2$ or $LiNi_{0.5}Co_{0.2}Mn_{0.3}O_2$, which can realize a capacity at a level of 160 mAh/g, is expected as a next-generation cathode material for a LIB for vehicles.

PRIOR ART DOCUMENTS

Patent Documents

Patent Document 1: Japanese Patent No. 4740415
Patent Document 2: Japanese Patent No. 5231171
Patent Document 3: Japanese Patent No. 5359140

SUMMARY OF INVENTION

Technical Problem

A LIB for vehicles is required to work within a temperature range at a level of from −30 to 70° C. Thus, the cathode material is required to exhibit battery characteristics equal to those at room temperature even in the above temperature range. Particularly, a conventional cathode material has problems in low output characteristics in low temperature environment (hereinafter referred to as low temperature characteristics).

Patent Document 1 proposes a cathode material comprising crystals of a composite oxide comprising a plurality of primary particles agglomerated to form secondary particles, wherein the ratio of the sum of the lengths of sides shared by the primary particles, the crystal orientation in the c-axis direction and the porosity of the secondary particles are adjusted, thereby to improve the output characteristics at low temperature. However, this method has problems such that the lithium ion diffusion in the primary particles is insufficient, although the electrical conduction network may be maintained even in the low temperature environment by an increased contact area of the primary particles.

Patent Document 2 proposes a cathode material having a high capacity and high safety, by adjusting the composition of Ni, Co and Mn, the compressed density of the cathode material and the volume resistivity when compressed. However, this proposal has problems in that the lithium ion diffusion in the primary particles is not sufficient although the contact resistance between the secondary particles can be reduced.

Patent Document 3 proposes a lithium transition metal compound powder for a cathode material comprising at least one element selected from the group consisting of Mo, W, Nb, Ta and Re, wherein the half value width of the (110) diffraction peak present in the vicinity of a diffraction angle 2θ of from 64.5 to 65° in powder X-ray diffraction is adjusted thereby to increase the crystallinity and to improve the output characteristics. However, this proposal has problem in that the output characteristics at low temperature are not sufficient.

Under these circumstances, the object of the present invention is to provide a lithium-containing composite oxide having high lithium ion diffusibility in primary particles and having excellent low temperature characteristics, and a process for its production. Another object of the present invention is to provide a positive electrode comprising the lithium-containing composite oxide and a LIB using the positive electrode.

Solution to Problem

The present inventors have conducted extensive studies to achieve the above objects and as a result, found that the diffusibility of lithium ions in the primary particles and the low temperature characteristics of the lithium-containing composite oxide are greatly influenced by the crystal structure particularly by the lattice constants of the a-axis and c-axis. That is, the present invention provides the following.

[1] A lithium-containing composite oxide essentially containing Li, Ni, Co and Mn, which has a crystal structure with space group R-3m, with a c-axis lattice constant being from 14.208 to 14.228 Å, and with an a-axis lattice constant and the c-axis lattice constant satisfying the relation of $3a+5.615 \leq c \leq 3a+5.655$, and of which the integrated intensity ratio ($I_{003}/I_{104}$) of the (003) peak to the (104) peak in an XRD pattern is from 1.21 to 1.39.

[2] The lithium-containing composite oxide according to [1], which is a compound represented by the Formula 1:

$$Li_pNi_xCo_yMn_zMe_qO_rF_s \qquad \text{Formula 1}$$

wherein $1.01 \leq p \leq 1.1$, $0.4 \leq x \leq 0.5$, $0.24 \leq y \leq 0.35$, $0.17 \leq z \leq 0.25$, $0 \leq q \leq 0.01$, $0.9 \leq x+y+z+q \leq 1.05$, $1.9 \leq r \leq 2.1$, $0 \leq s \leq 0.03$, and Me is at least one member selected from the group consisting of Mg, Ca, Sr, Ba, Al and Zr.

[3] The lithium-containing composite oxide according to [1] or [2], wherein the (110) crystallite size in an XRD pattern is from 400 to 760 Å.

[4] The lithium-containing composite oxide according to any one of [1] to [3], wherein the average particle size $D_{50}$ is from 0.1 to 30 μm.

[5] The lithium-containing composite oxide according to any one of [1] to [4], wherein the following R-factor is from 0.37 to 0.44:

R-factor: a value calculated in accordance with the Formula 2 from the integrated intensities ($I_{102}$, $I_{006}$ and $I_{101}$) of the (102), (006) and (101) peaks in an XRD pattern:

$$R\text{-factor}=(I_{102}+I_{006})/I_{101} \qquad \text{Formula 2}$$

[6] The lithium-containing composite oxide according to any one of [1] to [5], wherein the (003) crystallite size in an XRD pattern is from 700 to 1,200 Å.

[7] A process for producing the lithium-containing composite oxide as defined in any one of [1] to [6], which comprises mixing a composite compound essentially containing Ni, Co and Mn with a lithium compound, and firing the obtained mixture in an oxygen-containing atmosphere.

[8] The process for producing the lithium-containing composite oxide according to [7], wherein the composite compound is a hydroxide containing Ni, Co and Mn, and the (100) crystallite size of the hydroxide in an XRD pattern is from 130 to 300 Å.

[9] A positive electrode for a lithium ion secondary battery, which comprises the lithium-containing composite oxide as defined in any one of [1] to [6], a binder and an electrically conductive material.

[10] A lithium ion secondary battery, which comprises the positive electrode as defined in [9], a separator, a negative electrode and a non-aqueous electrolyte.

Advantageous Effects of Invention

The lithium-containing composite oxide of the present invention is excellent in the low temperature characteristics.

DETAILED DESCRIPTION OF INVENTION

In this specification, the expression "Li" means a Li element, not a Li metal simple substance, unless otherwise specified. The same applies to expressions of the other elements such as Ni, Co and Mn.

(Lithium-Containing Composite Oxide)

The lithium-containing composite oxide of the present invention (hereinafter referred to as the present composite oxide) contains as essential components Li, Ni, Co and Mn. Further, the present composite oxide contains an optional component as the case requires. The optional component is preferably F, Mg, Ca, Sr, Ba, Al or Zr with a view to increasing various battery characteristics of the lithium-containing composite oxide.

The present composite oxide is a hexagonal layered compound and has a crystal structure of space group R-3m. The crystal structure is preferably a single phase of space group R-3m, with a view to exhibiting excellent battery performance.

The present composite oxide having an R-3m crystal structure is confirmed by X-ray diffraction (XRD) spectrum and by detecting peaks attributable to R-3m. Further, the single phase of space group R-3m is confirmed by detecting no space group crystal structure peak and raw materials peak, except for the peaks attributable to R-3m.

Figure 1:
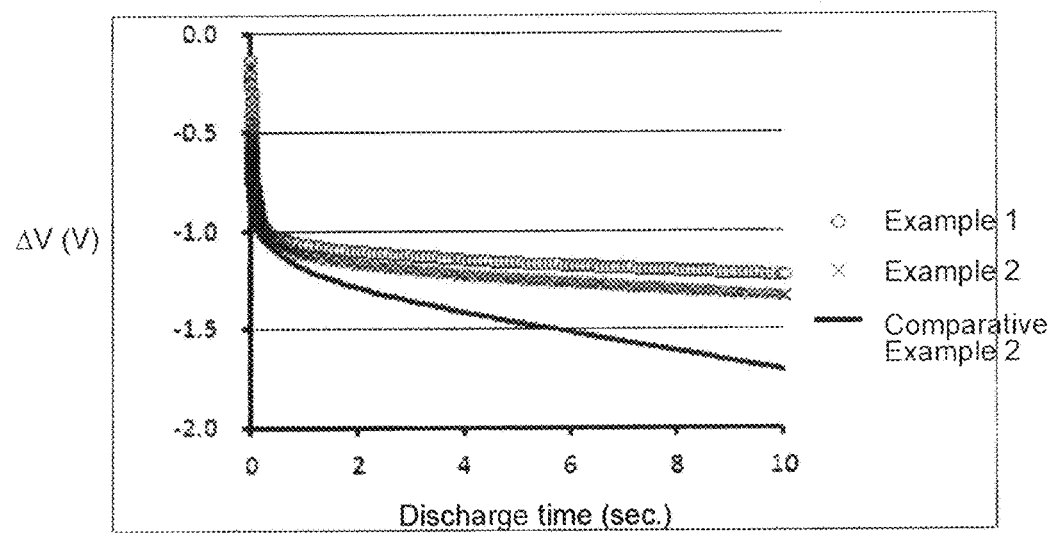
FIG. 1 is a graph illustrating changes with time of the voltages when batteries were discharged at a rate of 5 C from a state where SOC is 50% at −30° C.
Figure 2:
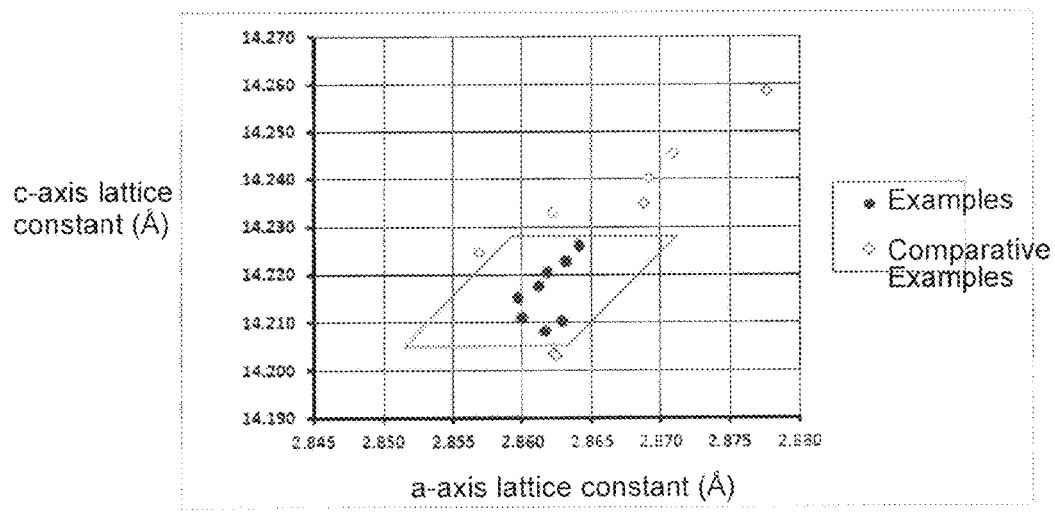
FIG. 2 is a graph illustrating the relations between the lattice constants of the a-axis and the c-axis of the lithium-containing composite oxides in Examples and Comparative Examples.
Figure 3:
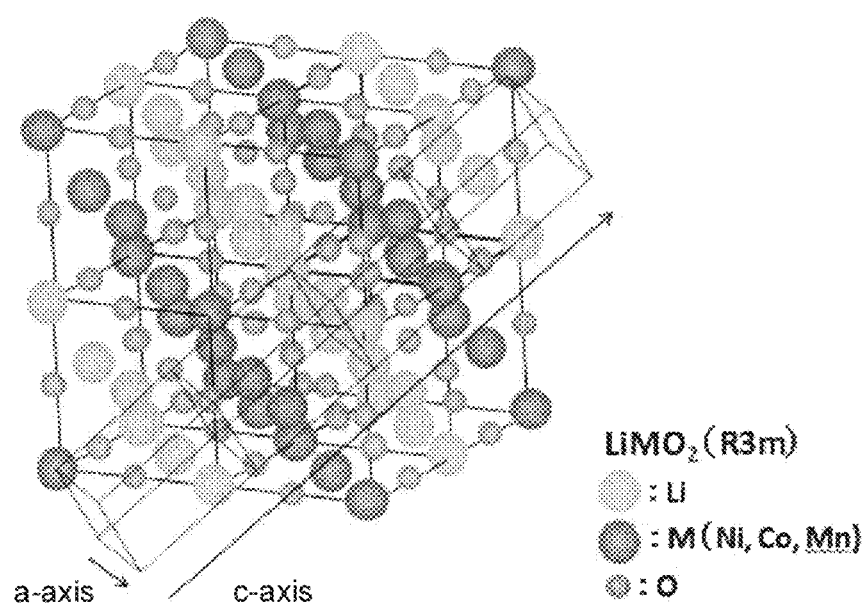
FIG. 3 is a view schematically illustrating the crystal structure of space group R-3m which is a structure of the lithium-containing composite oxide.

The crystal structure of R-3m is, as shown in FIG. 3, a structure having transition metal-oxygen octahedral layers centering on the transition metal laminated to sandwich lithium. The lattice constant in the a-axis direction is determined by the action of the distance between transition metal atoms, the distance between lithium atoms and the distance between oxygen atoms, and the lattice constant in the c-axis direction is determined by three layers consisting of transition metal-oxygen-lithium-oxygen. Here, in a case where the proportion of the transition metal elements in the transition metal site in the crystal structure differs or in a case where excessively added lithium is present in the transition metal site, the respective lattice constants vary since the distance between the transition metal elements and the distance between the transition metal and the oxygen atom vary by a change in the ion radius due to a difference in the ion radius among the respective elements and due to a change in the valence of the transition metal. Thus, it is considered that in an ideal crystal structure of R-3m, the lattice constant of the c-axis vary in proportion to three times the lattice constant of the a-axis by a change in the transition metal proportion or the Li/MT ratio. Further, it is considered that in a lithium-containing composite oxide having a crystal structure with a predetermined difference between three times the lattice constant of the a-axis and the lattice constant of the c-axis, Li is likely to diffuse in the lithium layer in the layered structure.

The crystal structure of the present composite oxide has a lattice constant of the c-axis of from 14.208 to 14.228 Å and satisfies a relation between the lattice constant (a) of the a-axis and the lattice constant (c) of the c-axis of $3a+5.615 \leq c \leq 3a+5.655$. Thus, lithium ions are likely to diffuse in the primary particles, and the present composite oxide is excellent in low temperature characteristics. The reason why the low temperature characteristics are improved when the lattice constant of the a-axis and the lattice constant of the c-axis satisfy the above relation is not clearly understood, but is considered to be because within small ranges of the lattice constants of the a-axis and the c-axis as compared with those of a conventional lithium-containing composite oxide, the lithium-containing composite oxide has a structure close to an ideal crystal structure of R-3m, and the diffusion resistance of Li tends to be low.

In order to obtain a lithium-containing composite oxide having excellent low temperature characteristics, the lattice constant of the c-axis is preferably from 14.21 to 14.225 Å, more preferably from 14.213 to 14.223 Å. Further, the lattice constant (a) of the a-axis and the lattice constant (c) of the c-axis preferably satisfy a relation of $3a+5.620 \leq c \leq 3a+5.645$, more preferably $3a+5.625 \leq c \leq 3a+5.640$.

In this specification, the lattice constants of the a-axis and the c-axis are obtained by precisely measuring and analyzing XRD. In this specification, a sample having from 1 to 3 wt % of Si mixed as an internal standard is scanned at a scanning rate of 1°/min with a diffraction angle 2θ of from 15 to 75° to obtain the (003), (101), (006), (012), (104), (015), (009), (107), (018), (110) and (113) diffraction peak angles of the lithium-containing composite oxide, base on which the lattice constants are calculated. On that occasion, employing the (111), (220) and (311) diffraction peaks of the internal standard Si (manufactured by NIST, Silicon Powder 640d), the deviation in angle due to the apparatus is corrected to calculate accurate lattice constants.

The integrated intensity of a diffraction peak is calculated by software attached to an XRD apparatus (for example, PDXL attached to a powder X-ray diffraction apparatus SmartLab manufactured by Rigaku Corporation).

In this specification, the low temperature characteristics were evaluated by a voltage fall ($\Delta V$) when the lithium-containing composite oxide is discharged at a rate of 5 C from a state where SOC (state of charge) is 50% at −30° C. for 10 seconds. The SOC is calculated from the discharge capacity when discharged to 3.525V at 25° C. The lithium-containing composite oxide is evaluated to have more excellent low temperature characteristics when $\Delta V$ is smaller.

The present composite oxide is excellent in the rate retention (characteristics such that the charge and discharge capacity does not change regardless of the charge and discharge rate) since the ratio ($I_{003}/I_{104}$) of the integrated intensity of the (003) peak to the (104) peak in an XRD pattern is from 1.21 to 1.39. $I_{003}/I_{104}$ is an index how the cation mixing of the lithium-containing composite oxide is suppressed, and the higher the $I_{003}/I_{104}$, the more the cation mixing is suppressed. If the cation mixing is increased, transition metal elements are present in the lithium diffusion paths and diffusion of lithium is inhibited and as a result, the rate retention may be decreased. From the above viewpoint, $I_{003}/I_{104}$ is preferably from 1.23 to 1.35, more preferably from 1.24 to 1.29.

The (003) and (104) peaks are respectively present at diffraction angle 2θ of from 18 to 19° and 44 to 45°, in an XRD spectrum using CuKα radiation.

The present composite oxide preferably satisfies a relation of the molar ratio (Ni/Co ratio) of Ni to Co of from 1.4 to 2.0. A lithium-containing composite oxide having a Ni/Co ratio within such a range has an increased capacity along with redox of the transition metal and is excellent in the low temperature characteristics. In order to increase the capacity, the Ni/Co ratio is more preferably at least 1.5. In order to achieve excellent low temperature characteristics, the Ni/Co ratio is more preferably at most 1.6.

In the present composite oxide, the molar ratio (Li/MT ratio) of Li to the total amount (MT) of metal components other than Li is preferably from 0.96 to 1.22. When the Li/MT ratio is within such a range, the capacity of the lithium-containing composite oxide can be made high.

The present composite oxide is preferably a compound represented by the following Formula 1:

$$Li_pNi_xCo_yMn_zMe_qO_rF_s \quad \text{Formula 1}$$

wherein $1.01 \leq p \leq 1.1$, $0.4 \leq x \leq 0.5$, $0.24 \leq y \leq 0.35$, $0.17 \leq z \leq 0.25$, $0 \leq q \leq 0.01$, $0.9 \leq x+y+z+q \leq 1.05$, $1.9 \leq r \leq 2.1$, $0 \leq s \leq 0.03$ and Me is at least one element selected from the group consisting of Mg, Ca, Sr, Ba, Al and Zr.

The compound represented by the Formula 1 may, for example, be specifically $Li_{1.01}Ni_{0.426}Co_{0.297}Mn_{0.267}O_2$, $Li_{1.02}Ni_{0.441}Co_{0.294}Mn_{0.245}O_2$, $Li_{1.03}Ni_{0.456}Co_{0.291}Mn_{0.223}O_2$, $Li_{1.04}Ni_{0.480}Co_{0.288}Mn_{0.192}O_2$, $Li_{1.01}Ni_{0.426}Co_{0.297}Mn_{0.267}O_2$ or $Li_{1.03}Ni_{0.414}Co_{0.308}Mn_{0.241}Zr_{0.003}O_2$.

The types and the contents of the metal elements contained in the present composite oxide are measured by ICP (inductively-coupled plasma) spectrometer. Since production conditions and the ratios of charged raw materials substantially agree with the ICP analysis values, in a case where the present composite oxide cannot be subjected to ICP measurement, the types and the contents of metal elements contained in the present composite oxide are calculated from the ratios of charged raw materials.

p is the content of Li which is an essential component in the present composite oxide. When p is within the above range, since the cation mixing (a phenomenon such that metal atoms are replaced with lithium atoms in the crystal structure) is suppressed, the average valence of the transition metals may be adjusted to a proper value in the vicinity of from 3.03 to 3.07, and as a result, the capacity can be increased. With a view to reducing the cation mixing, p is more preferably at least 1.02, further preferably at least 1.03. Further, p is more preferably at most 1.07, further preferably at most 1.05, whereby the average valence of the transition metals is likely to be adjusted to the vicinity of a proper value.

x is the content of Ni contained in the present composite oxide. When x is within the above range, the capacity can be increased, and the safety can be improved. The discharge capacity per unit mass of the lithium-containing composite oxide depends on the Ni content and thus x is more preferably at least 0.43, further preferably at least 0.44. On the other hand, the safety may be decreased if the Ni content is too high, and accordingly x is more preferably at most 0.47, further preferably at most 0.46.

y is the content of Co which is an essential component of the present composite oxide. A lithium-containing composite oxide having y within the above range is excellent in the rate retention. In order to improve the rate retention, y is more preferably at least 0.26, further preferably at least 0.28. On the other hand, if the content of Co is high and the molar ratio of Co to Ni is high, the Ni valence may be low. Thus, y is more preferably at most 0.32, further preferably at most 0.3.

z is the content of Mn which is an essential component in the present composite oxide. A lithium-containing composite oxide having z within the above range hardly undergoes a change in the crystal structure at the time of charge and discharge, and tends to have a high initial charge and discharge efficiency. In order that the lithium-containing composite oxide hardly undergoes a change in the crystal structure, z is more preferably at least 0.18, further preferably at least 0.19. Further, in order to increase the initial charge and discharge efficiency, z is more preferably at most 0.26, further preferably at most 0.25.

q is the content of the metal element as an optional component in the present composite oxide. The effect of incorporation of the optional component is sufficiently obtained in a content of at most 0.01. q is further preferably at most 0.005. The metal element as the optional component is preferably at least one member selected from the group consisting of Mg, Ca, Sr, Ba, Al and Zr. With a view to improving the cycle durability of the lithium-containing composite oxide, the optional component is more preferably at least one member selected from the group consisting of Mg, Al and Zr. Further, the optional component is further preferably Zr, whereby the crystallite size can be reduced.

When the sum (x+y+z+q) of the contents of the metal components other than Li in the Formula 1 is from 0.9 to 1.05, the Li/MT ratio of the lithium-containing composite oxide can be made to be within a predetermined range.

r is the content of oxygen contained in the present composite oxide. When r is within a range of from 1.9 to 2.1, the crystal structure of the lithium-containing composite oxide can be stabilized.

s is the content of F as the optional component in the present composite oxide. Part of oxygen in the lithium-containing composite oxide is preferably replaced with F in the above content, whereby the safety will be improved. s is more preferably at most 0.01, further preferably at most 0.005, whereby both the capacity and the safety can be made high.

The molar ratio (x/y) of Ni to Co in the Formula 1 is more preferably from 1.4 to 2.0, with a view to obtaining a lithium-containing composite oxide having a high capacity along with redox of the transition metals and having excellent low temperature characteristics. In order to increase the capacity, x/y is more preferably at least 1.5. In order to achieve excellent low temperature characteristics, x/y is more preferably at most 1.6.

The (110) crystallite size in the XRD pattern of the present composite oxide is preferably from 400 to 760 Å. When the crystallite size is at least 400 Å, the capacity can be increased since there is a sufficient amount of Li which contributes to charge and discharge, and the cycle durability can be improved since the amount of elution of the transition metals can be reduced. Further, when the crystallite size is at most 760 Å, the diffusion distance of Li in the crystal structure tends to be short, whereby excellent rate retention will be achieved. The (110) crystallite size is more preferably from 500 to 750 Å, further preferably from 600 to 700 Å.

The (003) crystallite size in the XRD pattern of the present composite oxide is preferably from 700 to 1,200 Å. When the crystallite size is at least 700 Å, the aspect ratio of the crystallite size in the c-axis direction to in the a-axis direction can be increased. As a result, the amount of lithium ions present between layers can be increased, whereby a high capacity will be achieved, the proportion of (110) exposed to the particle surface can be reduced, the amount of elution of the transition metals can be reduced, and the cycle durability can be improved. Further, when the crystallite size is at most 1,200 Å, the volume expansion and contraction in the c-axis direction at the time of charge and discharge can be made small. The (003) crystallite size is more preferably from 800 to 1,100 Å.

The (110) and (003) crystallite sizes are calculated by the Scherrer equation from the (110) and (003) peaks in an XRD pattern. The (110) and (003) peaks are respectively present at diffraction angle 2θ of from 64.5 to 65.5° and from 18 to 19° in an XRD spectrum using CuKα radiation.

Of the present composite oxide, R-factor is preferably from 0.37 to 0.44. The R-factor is the index of distortion of the crystallite, and R-factor of from 0.37 to 0.44 is advantageous in view of an effect to reduce the distortion in volume change at the time of charge and discharge. From the same viewpoint, the R-factor is more preferably from 0.39 to 0.43. The R-factor is a value calculated in accordance with the following Formula 2 from integrated intensities ($I_{102}$, $I_{006}$ and $I_{101}$) of the (102), (006) and (101) peaks in an XRD pattern. The (102), (006) and (101) peaks are respectively present at diffraction angle 2θ of from 38 to 39°, from 37 to 38° and from 36 to 37° in an XRD spectrum using CuKα radiation.

$$R\text{-factor}=(I_{102}+I_{006})/I_{101} \quad \text{Formula 2}$$

The average particle size $D_{50}$ of the present composite oxide is preferably from 0.1 to 30 μm. When $D_{50}$ is at least 0.1 μm, the electrode density can be made high. Further, when $D_{50}$ is at most 30 μm, excellent charge and discharge efficiency and rate retention will be achieved. From the same viewpoint, $D_{50}$ is more preferably from 1 to 13 μm, further preferably from 5 to 10 μm.

$D_{10}$ of the present composite oxide is preferably from 0.05 to 10 μm. $D_{10}$ of at least 0.05 μm is advantageous in that elution of the transition metals can be reduced. Further, $D_{10}$ of at most 10 is advantageous in view of the output characteristics. From the same viewpoint, $D_{10}$ is more preferably from 3 to 7 μm, further preferably from 4 to 6 μm.

$D_{90}$ of the present composite oxide is preferably from 5 to 50 μm. $D_{90}$ of at least 5 μm is advantageous in that the electrode density can be made high. Further, $D_{90}$ of at most 50 is advantageous in that the electrode coating thickness can be made thin. From the same viewpoint, $D_{90}$ is more preferably from 6 to 30 μm, further preferably from 7 to 20 μm.

$D_{10}$, the average particle size $D_{50}$ and $D_{90}$ of the lithium-containing composite oxide are particle sizes at points of 10%, 50% and 90%, respectively, in an accumulative curve from the small particle size side, the curve being obtained by measuring the particle size distribution on the volume basis using a laser scattering particle size distribution measuring apparatus and taking the whole to be 100%. The measurement of the laser scattering particle size distribution is carried out after the lithium-containing composite oxide is sufficiently dispersed in an aqueous medium by e.g. an ultrasonic treatment.

The tap density of the present composite oxide is preferably from 1.3 to 3 g/cm$^3$. A tap density of at least 1.3 g/cm$^3$ is advantageous in that the electrode density can be made high. A tap density of 3 g/cm$^3$ is advantageous in that the electrolytic solution is likely to infiltrate even into the interior of the particles, and the battery characteristics such as the rate retention are improved. From the same viewpoint, the tap density is more preferably from 1.4 to 2.7 g/cm$^3$.

The tap density of the lithium-containing composite oxide is calculated by dividing the mass of a sample packed in a container by the volume of the sample after tapping 700 times. The tap density may be measured, for example, by Tap Denser KYT-4000 manufactured by SEISHIN ENTERPRISE Co., Ltd.

The specific surface area of the present composite oxide is preferably from 0.1 to 10 m$^2$/g. A specific surface area of from 0.1 to 10 m$^2$/g is advantageous in that a dense cathode active material-containing layer having a high discharge capacity will be obtained, and excellent cycle durability will be achieved. The specific surface area is more preferably from 0.2 to 1 m$^2$/g, whereby excellent rate retention will be achieved.

The specific surface area of the lithium-containing composite oxide is a value measured by an adsorption BET (Brunauer, Emmett, Teller) method using a nitrogen gas. The specific surface area (SSA) can be measured by a specific surface area (SSA) measuring apparatus (manufactured by Mountech Co., Ltd., apparatus name: HM model-1208).

The remaining alkali amount in the present composite oxide is preferably at most 1.7 mol %. When the remaining alkali amount is at most 1.7 mol %, gelation of the slurry at the time of electrode coating can be suppressed. The remaining alkali amount is more preferably at most 1.5 mol %.

The remaining alkali amount is a percentage (mol %) of the amount of an alkali which is eluted into water per 1 mol of Li in the lithium-containing composite oxide when the lithium-containing composite oxide is dispersed in water.

(Process for Producing Lithium-Containing Composite Oxide)

The present composite oxide is preferably produced by mixing a compound essentially containing Ni, Co and Mn with a lithium compound and firing the obtained mixture. Hereinafter in this specification, a compound which essentially contains Ni, Co and Mn, and from which a lithium-containing composite oxide can be obtained by mixing with a lithium source, followed by firing, will be referred to as a precursor of the lithium-containing composite oxide (hereinafter referred to simply as a precursor). In production of the present composite oxide, when the precursor and the lithium source are mixed, as the case requires, a compound containing an element other than Li, Ni, Co and Mn may be used.

The precursor essentially contains Ni, Co and Mn, and is preferably one member selected from the group consisting of a hydroxide, an oxyhydroxide, an oxide and a carbonate or a mixture of two or more of them. Among them, the precursor is preferably a hydroxide, an oxyhydroxide or a mixture thereof, with a view to efficiently producing the lithium-containing composite oxide.

In the case of a hydroxide, an oxyhydroxide or a mixture thereof, the (100) crystallite size in an XRD pattern is preferably from 130 to 300 Å. When the (100) crystallite size is from 130 to 300 Å, the lattice constants of the a-axis and the c-axis of the lithium-containing composite oxide prepared by using such a precursor will be within the ranges of the present invention.

The tap density of the precursor is preferably from 1.3 to 3 g/cm$^3$. When the tap density of the precursor is within such a range, a lithium-containing composite oxide having a tap density within a preferred range will be obtained. The tap density of the precursor may be measured in the same manner as in the case of the lithium-containing composite oxide.

The specific surface area of the precursor is preferably from 5 to 20 m$^2$/g. When the specific surface area of the precursor is within such a range, a lithium-containing composite oxide having a specific surface area within a preferred range will be obtained. The specific surface area of the precursor may be measured in the same manner as in the case of the lithium-containing composite oxide.

$D_{10}$ of the precursor is preferably from 1 to 5 µm. $D_{50}$ of the precursor is preferably from 3 to 15 µm. $D_{90}$ of the precursor is preferably from 7 to 20 µm. $D_{10}$, $D_{50}$ and $D_{90}$ of the precursor may be measured in the same manner as in the case of the lithium-containing composite oxide.

As a method for producing the precursor, a coprecipitation preparation method of preparing a salt containing at least two metals (hereinafter referred to as a coprecipitation method) is preferred. The coprecipitation method is preferred in view of excellent productivity of the precursor and with a view to making the metal composition of the precursor uniform. Production of the precursor is preferably carried out by adding an alkali to an aqueous solution essentially containing Ni, Co and Mn, to prepare a salt.

The aqueous solution containing Ni, Co and Mn is preferably prepared by dissolving a nickel compound, a cobalt compound and a manganese compound in an aqueous medium. Each of the nickel compound, the manganese compound and the cobalt compound may, for example, be an inorganic salt such as a sulfate, a nitrate or a carbonate, an oxide, a hydroxide or an organic compound, containing each element. The oxide may, for example, be NiO, Mn$_3$O$_4$, Mn$_2$O$_3$, MnO$_2$, CoO, Co$_2$O$_3$ or Co$_3$O$_4$. The hydroxide may, for example, be Ni(OH)$_2$, Mn(OH)$_2$ or Co(OH)$_2$. The organic compound may, for example, be nickel fatty acid, manganese citrate, manganese fatty acid or Co(OAc)$_2$. Among them, preferred is a sulfate containing Ni, Co or Mn, which is highly soluble in an aqueous medium and which is less likely to corrode the production facility. Further, the nickel compound, the manganese compound and the cobalt compound may be compounds of the same type or may be compounds of different types.

The aqueous solution containing Ni, Co and Mn may contain a compound of an element other than Ni, Co and Mn as the case requires. Such another element is preferably at least one member selected from the group consisting of Mg, Ca, Sr, Ba, Al and Zr. Such a compound may, for example, be an inorganic salt such as a sulfate, a nitrate or a carbonate, an oxide, a hydroxide or an organic compound of each element. In the same manner as above, preferred is a sulfate containing Mg, Ca, Sr, Ba, Al or Zr.

The aqueous medium may be water or a mixture containing water and a component other than water. The aqueous medium is preferably water, in view of the environment, the handling efficiency and a low production cost. The component other than water may, for example, be methanol, ethanol, 1-propanol, 2-propaqnol or a polyol. The polyol may, for example, be ethylene glycol, propylene glycol, diethylene glycol, dipropylene glycol, polyethylene glycol, butanediol or glycerin. In a case where the aqueous medium is a mixture, the content of the component other than water based on the total mass of the aqueous medium is preferably at most 20 mass %, more preferably at most 10 mass %, further preferably at most 1 mass %.

The concentration of the nickel compound, the cobalt compound and the manganese compound in the aqueous solution containing Ni, Co and Mn is properly adjusted depending upon the composition of the desired lithium-containing composite oxide. In a case where a compound of an element other than Ni, Co and Mn is contained, the concentration of such a compound is also properly adjusted depending upon the composition of the desired lithium-containing composite oxide.

In order that the present composite oxide has a preferred composition, the content of the nickel compound in the aqueous solution containing Ni, Co and Mn is preferably from 1 to 4 mol/L, more preferably from 1.5 to 3.5 mol/L, further preferably from 2 to 3 mol/L.

In the same manner as in the case of the nickel compound, the content of the cobalt compound in the aqueous solution containing Ni, Co and Mn is preferably from 0.5 to 2.5 mol/L, more preferably from 1 to 2.5 mol/L, further preferably from 1.2 to 2 mol/L.

In the same manner as in the case of the nickel compound, the content of the manganese compound in the aqueous solution containing Ni, Co and Mn is preferably from 0.3 to 2 mol/L, more preferably from 0.5 to 1.5 mol/L, further preferably from 0.7 to 1.3 mol/L.

The content of the compound containing an element other than Ni, Co and Mn is preferably from 0.01 to 1 mol/L.

The alkali is preferably a hydroxide or carbonate containing an alkali metal element. Specifically, it may, for example, be sodium hydroxide, lithium hydroxide, potassium hydroxide, sodium carbonate, potassium carbonate or lithium carbonate. With a view to increasing the handling efficiency and the reactivity, the alkali is preferably used as an alkali aqueous solution.

From the viewpoint of the efficiency for production of the precursor, the concentration of the alkali aqueous solution is preferably from 1 to 12 mol/kg, more preferably from 6 to 12 mol/kg.

As a method for producing the precursor, preferred is a method of preparing nuclei of a coprecipitate in a first reactor, transferring the nuclei to a second reactor, and subjecting the nuclei to particle growth in the second reactor. A lithium-containing composite oxide prepared by using a precursor obtained by such a production method has lattice constants of the a-axis and the c-axis within ranges of the present invention. In the above method for producing the precursor, in addition to the above steps, another step may properly be carried out as the case requires.

In the first reactor, the aqueous solution containing Ni, Co and Mn and the alkali are continuously supplied to prepare nuclei of the coprecipitate. In the first reactor, water may preliminarily be put before the aqueous solution containing Ni, Co and Mn and the alkali are supplied. As a method of continuously supplying the aqueous solution containing Ni, Co and Mn and the alkali to the first reactor, a dropping method or a method of pumping them from piping inserted to the reaction solution may, for example, be mentioned. When the aqueous solution containing Ni, Co and Mn and the alkali are supplied, the solution is preferably stirred, and the solution is preferably bubbled with e.g. a nitrogen gas.

In the first reactor, while the aqueous solution containing Ni, Co and Mn and the alkali are supplied, it is preferred to allow a slurry containing the nuclei to overflow from an overflow port, whereby the solid content concentration in the first reactor may be maintained to such an extent that agglomeration of the nuclei is suppressed, and growth of the nuclei in the first reactor may be suppressed. The overflowing slurry containing the nuclei may be stored in a separate container, or as described hereinafter, may be directly transferred to the second reactor.

While the aqueous solution containing Ni, Co and Mn is supplied to the first reactor, the pH of the solution in the first reactor is preferably maintained to be from 11 to 13.5. When the pH in the reactor is maintained to be from 11 to 13.5, the aqueous solution containing Ni, Co and Mn and the alkali are quickly reacted with each other, whereby formation of the nuclei is dominant over growth of the nuclei. The pH of the solution is more preferably from 12 to 13. The pH of the solution may be adjusted by the alkali supply rate. Further, in the first reactor, the temperature of the solution is preferably from 45 to 70° C.

The rate of supply of the aqueous solution containing Ni, Co and Mn to the first reactor is preferably from 0.1 to 3 L/hr, more preferably from 0.5 to 2 L/hr, further preferably from 1 to 1.5 L/hr.

The rate of supply of the alkali to the first reactor is not limited so long as the pH of the solution is maintained to be within the above range, and is preferably from 0.01 to 0.5 L/hr, more preferably from 0.02 to 0.1 L/hr.

In the first reactor, a complexing agent which stabilizes Ni, Co and Mn ions in the solution is preferably supplied continuously. Ni, Co and Mn differ from one another in the solubility depending upon the pH of the solution. By adding the complexing agent, the difference in the solubility among these metals may be reduced and as a result, nuclei of a coprecipitate having a uniform metal composition will be prepared.

The complexing agent is one forming a complex with Ni, Co and Mn. Specifically, ammonia, ammonium sulfate, ammonium bicarbonate or ammonium hydrogencarbonate may, for example, be mentioned as a preferred complexing agent. In order to reduce the difference in the solubility among Ni, Co and Mn, the amount of supply of the complexing agent to the first reactor is preferably such that the molar ratio to the total number of moles of Ni, Co and Mn is from 0.01 to 10, more preferably from 0.1 to 1.

The nuclei obtained in the first reactor are transferred to the second reactor. As a method of transferring the nuclei, a method of transferring the overflowing slurry containing the nuclei from the first reactor to the second reactor, a method of transferring the overflowing slurry to a separate container and transferring it from the container to the second reactor, or a method of transferring the slurry containing the nuclei through piping provided at the upper portion of the first reactor to the second reactor may, for example, be mentioned. Among them, preferred is the method of transferring the overflowing slurry containing the nuclei from the first reactor to the second reactor, which is simple.

In the second reactor, the aqueous solution containing Ni, Co and Mn and the alkali are continuously supplied to grow the nuclei to prepare the precursor. The method of supplying the aqueous solution containing Ni, Co and Mn and the alkali may be the same as the method in the case of the first reactor.

In the second reactor, while the aqueous solution containing Ni, Co and Mn and the alkali are supplied, it is preferred to remove the supernatant liquid through e.g. filter cloth from the overflow port, whereby the solid content concentration in the second reactor can be increased, and growth of the nuclei and particles grown from the nuclei is dominant over formation of the nuclei. As a result, growth of the particles tends to be uniform, and a precursor with high sphericity and with a narrow particle size distribution will be obtained.

In the second reactor, while the aqueous solution containing Ni, Co and Mn and the alkali are supplied, a complexing agent is preferably supplied continuously. The complexing agent and the amount of supply of the complexing agent may be the same as in the case of the first reactor.

While the nuclei are grown, the pH of the slurry in the second reactor is preferably maintained to be from 9 to 11.5. When the pH of the slurry is maintained within such a range, growth of the nuclei is likely to proceed. The pH of the slurry is more preferably maintained to be from 9.5 to 10.5. The temperature of the slurry in the second reactor is preferably from 20 to 40° C. The time for which the nuclei are grown in the second reactor is not particularly limited and is properly selected depending upon the desired size of the particles.

The precursor obtained in the second reactor is preferably subjected to filtration and washed with water, whereby impurities can be removed from the precursor. The precursor is preferably dried after washed with water. The drying temperature is preferably from 80 to 140° C. The drying time is not particularly limited so long as the water content can be removed.

In the process for producing the present composite oxide, the lithium source may, for example, be lithium hydroxide, lithium carbonate or lithium nitrate. Preferred is lithium carbonate, which is easily handled.

As a method of mixing the precursor with the lithium source, a known method may be employed. The mixing ratio of the lithium source and the precursor at the time of mixing is set depending upon the desired composition of the lithium-containing composite oxide. In order to obtain a preferred composition of the present composite oxide, the mixing ratio is preferably such that the molar ratio (Li/MT) of Li to the total amount of metals (MT) contained in the precursor is from 1.03 to 1.12, more preferably from 1.03 to 1.07.

When the precursor and the lithium source are mixed, it is preferred to mix a compound of at least one element selected from the group consisting of F, Mg, Ca, Sr, Ba, Al and Zr. Such a compound may, for example, be an inorganic salt, an oxide, a hydroxide or an organic compound containing each metal. Preferred is an oxide containing each metal in view of handling efficiency in the production process.

The compound to be mixed is preferably a Zr compound, whereby growth of the (110) crystallite size in an XRD pattern of the lithium-containing composite oxide during firing can be suppressed, and more preferred is $ZrO_2$, in view of excellence in such an effect.

When the compound of at least one element (X) selected from the group consisting of F, Mg, Ca, Sr, Ba, Al and Zr is mixed, the mixing ratio is set depending upon the desired composition of the lithium-containing composite oxide. In order to obtain a preferred composition of the present composite oxide, the molar ratio (X/MT) of the element (X) to the total amount (MT) of the metals contained in the precursor is preferably higher than 0 and at most 0.012.

The above obtained mixture is fired to obtain a lithium-containing composite oxide. The firing temperature is preferably from 800 to 970° C., more preferably from 810 to 960° C., further preferably from 870 to 940° C. The firing temperature is not the set temperature of a firing furnace but is a value indicated by universal thermal history sensors (Referthermo, manufactured by Japan Fine Ceramics Center) or a value indicated by a thermocouples in the vicinity of the sample. The firing temperature is preferably an oxygen-containing atmosphere, more preferably an air atmosphere.

(Positive Electrode for Lithium Ion Secondary Battery)

The positive electrode for a lithium ion secondary batter of the present invention (hereinafter referred to as the present positive electrode) comprises the present composite oxide as a cathode active material. That is, the present positive electrode comprises the present composite oxide, a binder and an electrically conductive material. The present positive electrode has a layer containing the present composite oxide, a binder and an electrically conductive material (hereinafter referred to as a cathode active material-containing layer) on a positive electrode current collector.

The thickness of the cathode active material-containing layer is preferably from 20 to 80 μm, more preferably from 30 to 50 μm.

The present positive electrode is preferably formed by applying a coating slurry containing the present composite oxide on the positive electrode current collector, followed by pressurizing to form a cathode active material layer.

The coating slurry contains the present composite oxide, the binder, the electrically conductive material and a solvent. As a method of applying the coating slurry to the positive electrode current collector, a known method may be employed. Preferred is doctor blade coating, whereby a uniform thickness is achieved. In order that the cathode active material layer has the above-mentioned thickness, the thickness of the coating slurry is also preferably from 20 to 80 μm, more preferably from 30 to 50 μm.

The binder may, for example, be a fluororesin, a polyolefin, a polymer or copolymer having unsaturated bonds, or an acrylic type polymer or copolymer. The fluororesin is preferably polyvinylidene fluoride or polytetrafluoroethylene. The polyolefin is preferably polyethylene or polypropylene. The polymer having unsaturated bonds is preferably a styrene/butadiene rubber, an isoprene rubber or a butadiene rubber. The acrylic type polymer is preferably an acrylic polymer or a methacrylic polymer.

The electrically conductive material may, for example, be carbon black, graphite or carbon fibers. The carbon black is preferably acetylene black or Ketjen black.

The solvent of the coating slurry may, for example, be N-methylpyrrolidone.

The positive electrode current collector may, for example, be stainless steel, aluminum, an aluminum alloy, copper or nickel.

The coating slurry applied to the positive electrode current collector is pressurized by e.g. a roll pressing machine. The applied pressure is preferably at most 1 t/cm, more preferably at most 0.5 t/cm.

From the present composite oxide, a cathode active material-containing layer having a high electrode density and a high current density can be obtained even when the applied pressure is low. Thus, strong production facilities which withstand a high pressure are unnecessary. Further, since the applied pressure is low, a decrease in the yield due to breakage of the positive electrode in production of the positive electrode can be suppressed, and further, a decrease in the safety when used for a lithium ion secondary battery can be suppressed.

(Lithium Ion Secondary Battery)

The lithium ion secondary battery of the present invention (hereinafter referred to as the present battery) comprises the present positive electrode. That is, it contains at least the present positive electrode, a separator, a negative electrode and a non-aqueous electrolyte.

The present battery is preferably produced by laminating the present positive electrode, a separator and a negative electrode, and adding a non-aqueous electrolyte. As a method of adding a non-aqueous electrolyte, a method of injecting the non-aqueous electrolyte to a laminate of the positive electrode, the separator and the negative electrode, or a method of dipping the laminate in the non-aqueous electrolyte may, for example, be mentioned.

As the separator, paper, cellophane, polyolefin nonwoven fabric, polyamide nonwoven fabric, glass fiber nonwoven fabric, or porous polypropylene may, for example, be used. As paper, for example, kraft paper, vinylon mixed paper or synthetic pulp mixed paper may, for example, be mentioned. The shape of the separator is a sheet form. The structure of the separator may be a single layer structure or a multilayer structure.

The negative electrode comprises a negative electrode current collector and an anode active material-containing layer. As the negative electrode current collector, nickel, copper or stainless steel may, for example, be used. The anode active material-containing layer contains an anode active material and as the case requires, contains a binder. The binder for the negative electrode may be the same binder as for the cathode active material-containing layer.

The anode active material may be any material so long as it is capable of absorbing and desorbing lithium ions and may, for example, be a lithium metal, a lithium alloy, a lithium compound, a carbon material, a silicon carbide compound, a silicon oxide compound, titanium sulfide, a boron carbide compound, or an alloy composed mainly of silicon, tin or cobalt.

The carbon material may, for example, be non-graphitized carbon, artificial graphite, natural graphite, thermally decomposed carbon, cokes, graphites, glassy carbons, an organic polymer compound fired product, carbon fibers, activated carbon or carbon blacks.

The anode active material-containing layer may be prepared by mixing the anode active material, the binder and a solvent to prepare a slurry, applying the prepared slurry on the negative electrode current collector, followed by drying and pressing.

As the non-aqueous electrolyte, a known material used for a lithium ion secondary battery, such as a non-aqueous electrolytic solution, an inorganic solid electrolyte, or a solid or gelled polymer electrolyte in which an electrolyte salt is mixed with or dissolved in e.g. a polymer compound, may be used.

The non-aqueous electrolytic solution may be one prepared by properly combining an organic solvent and an electrolyte salt.

As the organic solvent, dimethyl carbonate, diethyl carbonate, ethyl methyl carbonate or a mixture thereof may suitably be used. The electrolyte salt may, for example, be $LiClO_4$, $LiPF_6$, $LiBF_4$, $CF_3SO_3Li$, LiCl or LiBr.

Examples

Now, the present invention will be described in further detail with reference to Examples. However, it should be understood that the present invention is by no means restricted to such specific Examples. Ex. 1 to 8 are Examples of the present invention, and Ex. 9 to 16 are Comparative Examples.

Physical properties of the composite hydroxide used as the precursor and the lithium-containing composite oxide were measured by the following methods. Table 1 shows physical properties of the composite hydroxide as the precursor of the lithium-containing composite oxide, and Tables 2 and 3 show physical properties of the lithium-containing composite oxide.

<Compositional Analysis>

The composition ratio of metal components contained in each of the composite hydroxide and the lithium-containing composite oxide was measured by ICP analysis. The composition ratio (p, x, y, z, q) of the lithium-containing composite oxide in Table 2 indicates coefficients of the chemical formula represented by $Li_pNi_xCo_yMn_zZr_qO_2$.

<XRD Measurement>

XRD measurement of the composite hydroxide and the lithium-containing composite oxide was carried out using CuKα radiation by a powder X-ray diffraction analysis (manufactured by Rigaku Corporation, powder X-ray diffraction apparatus SmartLab). While a sample holder was rotated at 30 rpm, the sample was scanned at a scanning rate of 1°/min with diffraction angle 2θ of from 15 to 75° to obtain an XRD spectrum. Further, the integrated intensity of the diffraction peak of XRD was calculated by means of software attached to the XRD apparatus (PDXL attached to the powder X-ray diffraction apparatus SmartLab manufactured by Rigaku Corporation).

From the XRD spectrum, all the lithium-containing composite oxides in Ex. 1 to 16 were confirmed to have a single phase of space group R-3m.

Lattice Constant Measurement

From the XRD spectrum, the (003), (101), (006), (012), (104), (015), (009), (107), (018), (110) and (113) diffraction peak angles of the lithium-containing composite oxide were calculated, based on which the lattice constants were calculated. Further, using the (111), (220) and (311) diffraction peaks of internal standard Si (about 2 wt % of Silicon Powder 640d manufactured by NIST was added), the deviation in angle due to the apparatus was corrected to calculate lattice constants of the a-axis and the c-axis.

$I_{003}/I_{104}$ Measurement

From the XRD pattern, the (003) and (104) diffraction peak integrated intensities of the lithium-containing composite oxide were calculated and their ratio $I_{003}/I_{104}$ was obtained.

Crystallite Size

From the XRD pattern, the crystallite size was calculated in accordance with the Scherrer equation from the (110) and (003) diffraction peaks of the lithium-containing composite oxide.

R-Factor

R-factor was calculated from the above Formula 2 (($I_{102}$+$I_{006}$)/$I_{101}$) from the (102), (006) and (101) peak intensities.

<Particle Size Distribution Measurement>

Each of the composite hydroxide and the lithium-containing composite oxide was dispersed in water by ultrasonic treatment, and measurement was carried out by a laser diffraction/scattering type particle size distribution measuring apparatus (apparatus name: MT-3300EX manufactured by NIKKISO CO., LTD.) to obtain frequency distribution and an accumulative volume distribution curve. From the obtained accumulative volume distribution curve, $D_{10}$, $D_{50}$ and DM of each of the composite hydroxide and the lithium-containing composite oxide were obtained.

<Specific Surface Area>

The specific surface area of each of the composite hydroxide and the lithium-containing composite oxide was measured by a BET (Brunauer, Emmett, Teller) method using a specific surface area measuring apparatus (apparatus name: HM model-1208, manufactured by Mountech Co., Ltd.) using a nitrogen gas as an adsorption gas.

<Tap Density>

The tap density of each of the composite hydroxide and the lithium-containing composite oxide was measured by a tap density measuring apparatus (apparatus name: Tap Denser KYT-4000k, manufactured by SEISHIN ENTERPRISE Co., Ltd.). The tap density was calculated from the volume of each of the composite hydroxide and the lithium-containing composite oxide packed in a 20 mL plastic tapping cell and tapped 700 times with a 20 mm stroke.

<Remaining Alkali Amount>

1 g of the lithium-containing composite oxide and 50 g of pure water were added to a 30 mL screw vial, stirred with a stirrer for 30 minutes and subjected to filtration. The obtained filtrate was subjected to acid-base titration to an end point pH of 4.0 with 0.02 mol/L hydrochloric acid using HIRANUMA Potentiometric Titrator (apparatus name: COM-1750 manufactured by HIRANUMA SANGYO Co., Ltd.). The remaining alkali amount (mol %) in water per 1 mol of Li contained in the lithium-containing composite oxide was calculated from the titer.

(Ex. 1)

Nickel sulfate (nickel(II) sulfate hexahydrate, manufactured by Wako Pure Chemical Industries, Ltd.), cobalt sulfate (cobalt(II) sulfate heptahydrate, manufactured by Wako Pure Chemical Industries, Ltd.) and manganese sulfate (manganese(II) sulfate pentahydrate, manufactured by Wako Pure Chemical Industries, Ltd.) were dissolved in deionized water to obtain a solution, which was subjected to filtration to prepare a sulfate aqueous solution containing 2.15 mol/L of nickel sulfate, 1.60 mol/L of cobalt sulfate and 1.25 mol/L of manganese sulfate.

Then, 500 g of deionized water was added in a first reactor having a capacity of 1 L and stirred at 400 rpm at 60° C. while bubbling with a nitrogen gas. To this deionized water, while the sulfate aqueous solution and a 28 mass % ammonia aqueous solution were simultaneously continuously supplied respectively at 1.2 L/hr and 0.03 L/hr, a 18 mol/L sodium hydroxide aqueous solution was supplied to the first reactor to maintain the pH at 12.5.

A nuclear particles-containing slurry obtained in the first reactor was allowed to overflow from the first reactor and stored in a second reactor (capacity: 2 L) to a capacity of 80%. Then, in the second reactor, the nuclear particles-containing slurry was stirred at 400 rpm at 30° C. while bubbling with a nitrogen gas. The sulfate aqueous solution and a 28 mass % ammonia aqueous solution were simultaneously continuously supplied respectively at 1.2 L/hr and 0.03 L/hr, a 18 mol/L sodium hydroxide aqueous solution was supplied to the second reactor to maintain the pH at 10. The liquid amount in the reaction system was controlled by suction filtration through a filter, and after particle growth at 30° C. for 72 hours, the reaction slurry was subjected to filtration and washed with water to obtain a composite oxide. The obtained composite oxide was dried at 120° C. for 12 hours to obtain a composite hydroxide powder.

200.00 g of the composite hydroxide, 87.70 g of lithium carbonate having a Li content of 26.96 mol/kg ($Li_2CO_3$ manufactured by SQM) and 0.81 g of zirconium oxide ($ZrO_2$ manufactured by NIPPON DENKO CO., LTD.) were mixed and fired in the air atmosphere at 908° C. for 8 hours to obtain a lithium-containing composite oxide. Hereinafter the firing temperature is a value indicated by universal thermal history sensors (Referthermo, manufactured by Japan Fine Ceramics Center).

(Ex. 2)

A composite hydroxide powder was prepared in the same manner as in Ex. 1 except that in the sulfate aqueous solution, the concentration of nickel sulfate was 2.25 mol/L, the concentration of cobalt sulfate was 1.50 mol/L and the concentration of manganese sulfate was 1.25 mol/L.

A lithium-containing composite oxide was obtained in the same manner as in Ex. 1 except that 200.00 g of the above composite hydroxide, 83.73 g of lithium carbonate and 0.81 g of zirconium oxide were used and that the firing temperature was 919° C.

(Ex. 3)

A lithium-containing composite oxide was obtained in the same manner as in Ex. 1 except that 200.00 g of the composite hydroxide obtained by the method as disclosed in Ex. 2, 86.96 g of lithium carbonate and 0.81 g of zirconium oxide were used and that the firing temperature was 909° C.

(Ex. 4)

A lithium-containing composite oxide was obtained in the same manner as in Ex. 1 except that 200.00 g of the composite hydroxide obtained by the method as disclosed in Ex. 2, 86.96 g of lithium carbonate and 0.81 g of zirconium oxide were used and that the firing temperature was 919° C.

(Ex. 5)

A composite hydroxide powder was prepared in the same manner as in Ex. 1 except that in the sulfate aqueous solution, the concentration of nickel sulfate was 2.35 mol/L, the concentration of cobalt sulfate was 1.50 mol/L and the concentration of manganese sulfate was 1.15 mol/L.

A lithium-containing composite oxide was obtained in the same manner as in Ex. 1 except that 200.00 g of the above composite hydroxide, 84.03 g of lithium carbonate and 0.81 g of zirconium oxide were used and that the firing temperature was 919° C.

(Ex. 6)

A lithium-containing composite oxide was obtained in the same manner as in Ex. 1 except that 200.00 g of the composite hydroxide obtained by the method as disclosed in Ex. 5 and 87.00 g of lithium carbonate were used and that the firing temperature was 919° C.

(Ex. 7)

A composite hydroxide powder was prepared in the same manner as in Ex. 1 except that in the sulfate aqueous solution, the concentration of nickel sulfate was 2.25 mol/L, the concentration of cobalt sulfate was 1.50 mol/L and the concentration of manganese sulfate was 1.00 mol/L.

A lithium-containing composite oxide was obtained in the same manner as in Ex. 1 except that 200.00 g of the above composite hydroxide and 83.23 g of lithium carbonate were used and that the firing temperature was 922° C.

(Ex. 8)

A lithium-containing composite oxide was obtained in the same manner as in Ex. 1 except that 200.00 g of the composite hydroxide obtained by the method as disclosed in Ex. 7, 84.07 g of lithium carbonate and 0.81 g of zirconium oxide were used and that the firing temperature was 822° C.

(Ex. 9)

A composite hydroxide powder was prepared in the same manner as in Ex. 1 except that in the sulfate aqueous solution, the concentration of nickel sulfate was 1.75 mol/L, the concentration of cobalt sulfate was 1.75 mol/L and the concentration of manganese sulfate was 1.5 mol/L.

A lithium-containing composite oxide was obtained in the same manner as in Ex. 1 except that 200.00 g of the above composite hydroxide, 89.30 g of lithium carbonate and 0.81 g of zirconium oxide were used and that the firing temperature was 914° C.

(Ex. 10)

A composite hydroxide powder was prepared in the same manner as in Ex. 1 except that in the sulfate aqueous solution, the concentration of nickel sulfate was 2 mol/L, the concentration of cobalt sulfate was 1.5 mol/L and the concentration of manganese sulfate was 1.5 mol/L.

A lithium-containing composite oxide was obtained in the same manner as in Ex. 1 except that 200.00 g of the above composite hydroxide, 87.88 g of lithium carbonate and 0.81 g of zirconium oxide were used and that the firing temperature was 914° C.

(Ex. 11)

A composite hydroxide powder was prepared in the same manner as in Ex. 1 except that in the sulfate aqueous solution, the concentration of nickel sulfate was 2.5 mol/L, the concentration of cobalt sulfate was 1 mol/L and the concentration of manganese sulfate was 1.5 mol/L.

A lithium-containing composite oxide was obtained in the same manner as in Ex. 1 except that 200.00 g of the above composite hydroxide, 87.44 g of lithium carbonate and 0.81 g of zirconium oxide were used and that the firing temperature was 919° C.

(Ex. 12)

A lithium-containing composite oxide was obtained in the same manner as in Ex. 1 except that 200.00 g of the composite hydroxide obtained by the method as disclosed in Ex. 11 and 87.18 g of lithium carbonate were used and that the firing temperature was 922° C.

(Ex. 13)

A composite hydroxide powder was prepared in the same manner as in Ex. 1 except that in the sulfate aqueous solution, the concentration of nickel sulfate was 2.6 mol/L, the concentration of cobalt sulfate was 1 mol/L and the concentration of manganese sulfate was 1.4 mol/L.

A lithium-containing composite oxide was obtained in the same manner as in Ex. 1 except that 200.00 g of the above composite hydroxide, 84.26 g of lithium carbonate and 0.81 g of zirconium oxide were used and that the firing temperature was 914° C.

(Ex. 14)

A composite hydroxide powder was prepared in the same manner as in Ex. 1 except that in the sulfate aqueous solution, the concentration of nickel sulfate was 3 mol/L, the concentration of cobalt sulfate was 0.5 mol/L and the concentration of manganese sulfate was 1.5 mol/L.

A lithium-containing composite oxide was obtained in the same manner as in Ex. 1 except that 200.00 g of the above composite hydroxide, 84.26 g of lithium carbonate and 0.81 g of zirconium oxide were used and that the firing temperature was 934° C.

(Ex. 15)

A lithium-containing composite oxide was obtained in the same manner as in Ex. 1 except that 200.00 g of the composite hydroxide obtained by the method as disclosed in Ex. 7 and 8.82 g of lithium carbonate were used and that the firing temperature was 941° C.

(Ex. 16)

A lithium-containing composite oxide was obtained in the same manner as in Ex. 1 except that 200.00 g of the composite hydroxide obtained by the method as disclosed in Ex. 7 and 8.82 g of lithium carbonate were used and that the firing temperature was 965° C.

TABLE 1

| | Metal composition | | | Particle size (μm) | | | Specific surface area | Tap density | Crystallite size (Å) |
|---|---|---|---|---|---|---|---|---|---|
| | Ni (mol %) | Co (mol %) | Mn (mol %) | $D_{10}$ | $D_{50}$ | $D_{90}$ | ($m^2/g$) | ($g/cm^3$) | (100) |
| Ex. 1 | 43.1 | 32.1 | 24.8 | 3.8 | 5.5 | 8.1 | 13.41 | 1.23 | 147 |
| Ex. 2 | 45.2 | 29.8 | 25.0 | 4.5 | 6.8 | 8.7 | 9.84 | 1.71 | 248 |
| Ex. 5 | 47.1 | 30.0 | 22.9 | 3.5 | 5.3 | 8.1 | 7.54 | 1.85 | 265 |
| Ex. 7 | 50.0 | 29.8 | 20.2 | 3.6 | 5.4 | 8.5 | 7 | 1.77 | 202 |
| Ex. 9 | 35.0 | 34.9 | 30.1 | 4.8 | 6.8 | 8.9 | 11.8 | 1.68 | 178 |
| Ex. 10 | 39.9 | 30.1 | 30.0 | 4.2 | 5.6 | 7.6 | 12.04 | 1.5 | 216 |
| Ex. 11 | 50.1 | 19.9 | 30.0 | 4 | 5.3 | 7.3 | 12.76 | 1.79 | 297 |
| Ex. 13 | 52.0 | 20.0 | 28.0 | 3.9 | 6.1 | 9.9 | 9.34 | 1.89 | 232 |
| Ex. 14 | 60.0 | 10.2 | 29.8 | 4.2 | 5.7 | 8.2 | 15.92 | 1.53 | 214 |

TABLE 2

| | Metal composition | | | | | Lattice constant (Å) | | I(003)/I(104) |
|---|---|---|---|---|---|---|---|---|
| | p | x | y | z | q | a | c | |
| Ex. 1 | 1.034 | 0.414 | 0.308 | 0.241 | 0.003 | 2.8597 | 14.2152 | 1.37 |
| Ex. 2 | 1.014 | 0.444 | 0.293 | 0.246 | 0.003 | 2.8640 | 14.2261 | 1.24 |
| Ex. 3 | 1.034 | 0.435 | 0.287 | 0.241 | 0.003 | 2.8618 | 14.2207 | 1.27 |
| Ex. 4 | 1.034 | 0.435 | 0.287 | 0.241 | 0.003 | 2.8612 | 14.2178 | 1.29 |
| Ex. 5 | 1.014 | 0.462 | 0.295 | 0.226 | 0.003 | 2.8631 | 14.2229 | 1.25 |
| Ex. 6 | 1.034 | 0.454 | 0.290 | 0.222 | 0 | 2.8599 | 14.2111 | 1.28 |
| Ex. 7 | 1.014 | 0.493 | 0.296 | 0.197 | 0 | 2.8616 | 14.2082 | 1.29 |
| Ex. 8 | 1.014 | 0.491 | 0.295 | 0.197 | 0.003 | 2.8628 | 14.2103 | 1.29 |
| Ex. 9 | 1.043 | 0.334 | 0.334 | 0.286 | 0.003 | 2.8569 | 14.225 | 1.26 |
| Ex. 10 | 1.034 | 0.385 | 0.289 | 0.289 | 0.003 | 2.8622 | 14.2332 | 1.25 |
| Ex. 11 | 1.034 | 0.481 | 0.289 | 0.193 | 0.003 | 2.8691 | 14.2402 | 1.23 |
| Ex. 12 | 1.034 | 0.483 | 0.193 | 0.290 | 0 | 2.8688 | 14.2348 | 1.21 |
| Ex. 13 | 1.014 | 0.511 | 0.197 | 0.275 | 0.003 | 2.8709 | 14.2458 | 1.18 |
| Ex. 14 | 1.014 | 0.590 | 0.098 | 0.295 | 0.003 | 2.8776 | 14.2588 | 1.14 |
| Ex. 15 | 1.014 | 0.494 | 0.294 | 0.198 | 0 | 2.8622 | 14.2037 | 1.27 |
| Ex. 16 | 1.014 | 0.494 | 0.294 | 0.198 | 0 | 2.8624 | 14.2031 | 1.28 |

TABLE 3

| | Particle size (μm) | | | Specific surface area | Tap density | Remaining alkali | Crystallite size (Å) | | R-factor |
|---|---|---|---|---|---|---|---|---|---|
| | $D_{10}$ | $D_{50}$ | $D_{90}$ | ($m^2/g$) | ($g/cm^3$) | (mol %) | (110) | (003) | |
| Ex. 1 | 4.1 | 6.3 | 10.0 | 0.89 | 1.4 | 1.1 | 600 | 876 | 0.412 |
| Ex. 2 | 4.1 | 5.6 | 7.8 | 0.64 | 2.1 | 0.9 | 628 | 832 | 0.418 |
| Ex. 3 | 4.9 | 8.1 | 15.5 | 0.58 | 1.55 | 1.1 | 659 | 1030 | 0.397 |
| Ex. 4 | 4.4 | 7.0 | 12.2 | 0.78 | 1.48 | 1.5 | 679 | 956 | 0.389 |
| Ex. 5 | 4.6 | 7.7 | 13.9 | 0.54 | 1.65 | 1.0 | 617 | 846 | 0.406 |
| Ex. 6 | 5.4 | 9.7 | 18.3 | 0.53 | 1.64 | 1.4 | 679 | 904 | 0.398 |
| Ex. 7 | 6.3 | 10.3 | 17.1 | 0.5 | 1.72 | 1.1 | 744 | 939 | 0.427 |
| Ex. 8 | 6.0 | 10.8 | 19.0 | 0.48 | 1.66 | 1.0 | 708 | 964 | 0.406 |
| Ex. 9 | 4.5 | 6.0 | 8.5 | 0.78 | 2.08 | 1.0 | 563 | 747 | 0.373 |
| Ex. 10 | 4.1 | 5.5 | 7.9 | 0.83 | 1.71 | 1.1 | 570 | 741 | 0.397 |
| Ex. 11 | 5.1 | 9.1 | 17.9 | 0.65 | 1.46 | 1.2 | 653 | 1030 | 0.414 |
| Ex. 12 | 4.7 | 7.8 | 14.8 | 0.7 | 1.53 | 1.4 | 676 | 1093 | 0.413 |
| Ex. 13 | 5.5 | 9.3 | 16.7 | 0.51 | 1.74 | 1.0 | 645 | 1031 | 0.435 |
| Ex. 14 | 6.7 | 13.0 | 23.8 | 0.54 | 1.46 | 1.1 | 707 | 1093 | 0.471 |
| Ex. 15 | 6.0 | 10.6 | 19.1 | 0.44 | 1.78 | 0.8 | 863 | 1236 | 0.422 |
| Ex. 16 | 6.0 | 11.4 | 21.1 | 0.35 | 1.92 | 0.6 | 911 | 1348 | 0.429 |

(Evaluation of Battery Characteristics)

With respect to batteries 1 to 16 prepared as follows, the following battery characteristics were evaluated. The results are shown in Table 4. The battery characteristics are values measured at 25° C. unless otherwise specified. Various battery characteristics were measured by TOSCAT-3000 (manufactured by TOYO SYSTEM Co., Ltd.).

<Initial Characteristics>

The battery was charged to 4.3V with a load current of 192 mA per 1 g of the cathode active material (lithium-containing composite oxide) and discharged to 2.75V with a load current of 32 mA per 1 g of the cathode active material. The discharge capacity at from 4.3V to 2.75V was taken as the initial capacity, and the initial efficiency was calculated from the initial discharge capacity/initial charge capacity × 100 (unit: %).

<Low Temperature Characteristics>

At an environmental temperature of 25° C., the battery was charged to 4.3V with a load current of 192 mA per 1 g of the cathode active material and discharged to 2.75V with a load current of 32 mA per 1 g of the cathode active material. ½ of the capacity obtained at that time was calculated, and the battery was charged to the calculated capacity for a predetermined time with a load current of 32 mA per 1 g of the cathode active material. Then, the environmental temperature was lowered to −30° C. and the battery was maintained for 6 hours, and then the battery was discharged for 10 seconds with a load current of 800 mA per 1 g of the cathode active material. A voltage decrease in 10 seconds (ΔV) was regarded as the low temperature output characteristics.

<Rate Retention>

The battery was charged to 4.3V with a load current of 192 mA per 1 g of the cathode active material and discharged to 2.75V with a load current of 32 mA per 1 g of the cathode active material (0.2 C rate). Then, the battery was charged to 4.3V with a load current of 192 mA per 1 g of the cathode active material and then discharged to 2.75V with a load current of 480 mA per 1 g of the cathode active material (1 C rate). Further, the battery was charged to 4.3V with a load current of 192 mA per 1 g of the cathode active material and then discharged to 2.75V with a load current of 800 mA per 1 g of the cathode active material (5 C rate). The ratios (unit: %) of the capacities at the 1 C rate and at the 5 C rate based on the capacity at the 0.2 C rate were calculated respectively as rate retention.

<Cycle durability>

The battery was charged to 4.3V with a load current of 192 mA per 1 g of the cathode active material and discharged to 2.75V with a load current of 32 mA per 1 g of the cathode active material. Then, the battery was charged to 4.3V with a load current of 192 mA per 1 g of the cathode active material and then discharged to 2.75V with a load current of 480 mA per 1 g of the cathode active material. Further, the battery was charged to 4.3V with a load current of 192 mA per 1 g of the cathode active material and discharged to 2.75V with a load current of 800 mA per 1 g of the cathode active material.

Then, a charge and discharge cycle of charging to 4.3V with a load current of 192 mA per 1 g of the cathode active material and discharging to 2.75V with a load current of 160 mA per 1 g of the cathode active material was repeated 50 times. The ratio of the discharge capacity in the 50th charge and discharge cycle based on the initial capacity was taken as the cycle retention.

(Production of Positive Electrode)

A positive electrode was prepared using each of the lithium-containing composite oxides in Ex. 1 to 16 as the cathode active material. The lithium-containing composite oxide, acetylene black (tradename: DENKA BLACK manufactured by Denki Kagaku Kogyo Kabushiki Kaisha) and a polyvinylidene fluoride solution (solvent: N-methylpyrrolidone) containing 12.1 mass % of polyvinylidene fluoride (tradename: KFL #1120, manufactured by KUREHA CORPORATION) were mixed, and N-methylpyrrolidone was further added to prepare a slurry. The mass ratio of the lithium-containing composite oxide, acetylene black and polyvinylidene fluoride was such that lithium-containing composite oxide/acetylene black/polyvinylidene fluoride=90/5/5.

The slurry was applied on one side of an aluminum foil (tradename: E-FOIL manufactured by Toyo Aluminum K.K.) having an average thickness of 20 μm by means of a doctor blade, followed by drying at 120° C. and then by roll pressing (0.3 t/cm) twice to prepare a positive electrode.

(Production of Battery)

Using the above prepared positive electrode, a stainless steel simple sealed cell type lithium ion secondary battery was assembled in an argon glove box. Lithium ion secondary batteries assembled by using the positive electrode containing the lithium-containing composite oxides in Ex. 1 to 16 were regarded as batteries 1 to 16, respectively.

Materials other than the positive electrode of the lithium secondary battery are as follows.

Anode: A metal lithium foil having an average thickness of 500 μm (lithium foil, manufactured by THE HONJO CHEMICAL CORPORATION)

Anode current collector: A stainless steel plate having an average thickness of 1 mm Separator: Porous polypropylene having an average thickness of 25 μm (CELGARD #2500, manufactured by CELGARD)

Electrolytic solution: A $LiPF_6$ solution having a concentration of 1 mol/dm$^3$. The solvent is a mixture of ethylene carbonate (EC), dimethyl carbonate (DMC) and ethyl methyl carbonate (EMC) in a volume ratio of 1:1:1.

TABLE 4

| | Initial capacity (mAh/g) | Initial efficiency (%) | 1 C/ 0.2 C | 5 C/ 0.2 C | Cycle retention (%) | ΔV (V) |
|---|---|---|---|---|---|---|
| Ex. 1 | 164 | 89.3 | 94.2 | 85.6 | 97.4 | 1.22 |
| Ex. 2 | 171 | 90.2 | 94.5 | 85.8 | 97.4 | 1.30 |
| Ex. 3 | 169 | 90.6 | 95.3 | 87.9 | 95.8 | 1.22 |
| Ex. 4 | 166 | 90.3 | 94.7 | 85.8 | 98.3 | 1.15 |
| Ex. 5 | 171 | 90.1 | 94.7 | 84.9 | 97 | 1.19 |
| Ex. 6 | 169 | 90.6 | 95.2 | 87.3 | 95 | 1.36 |
| Ex. 7 | 174 | 90.9 | 95.1 | 86.9 | 93.8 | 1.30 |
| Ex. 8 | 170 | 89.5 | 95 | 86.8 | 95.2 | 1.09 |
| Ex. 9 | 160 | 89.5 | 94.2 | 84.4 | 98.6 | 1.48 |
| Ex. 10 | 163 | 89.3 | 93.9 | 84.4 | 99.4 | 1.70 |
| Ex. 11 | 168 | 88.8 | 94.2 | 85.1 | 93.7 | 2.00 |
| Ex. 12 | 172 | 89.5 | 94.5 | 85.7 | 93 | 2.05 |
| Ex. 13 | 167 | 87.1 | 94.1 | 83.4 | 97.6 | 1.62 |
| Ex. 14 | 171 | 86 | 93.4 | 83.1 | 94.7 | 3.05 |
| Ex. 15 | 171 | 90.3 | 94 | 85.3 | 92.8 | 1.52 |
| Ex. 16 | 166 | 87.8 | 92.9 | 83.1 | 92.6 | 1.78 |

As shown in Table 4, the lithium-containing composite oxide of the present invention has high initial characteristics, high cycle durability and high rate retention and is excellent in the low temperature characteristics.

The lithium-containing composite oxide of the present invention has improved low temperature characteristics without sacrificing battery characteristics of the initial characteristics, the cycle durability and the rate retentions. It is considered that such excellent low temperature characteristics are achieved because the lattice constants of the a-axis and the c-axis are small as compared with those of a conventional lithium-containing composite oxide and satisfy a relation of $3a+5.615 \leq c \leq 3a+5.655$, and as a result, the lithium-containing composite oxide has a crystal structure such that Li is likely to diffuse in the primary particles.

INDUSTRIAL APPLICABILITY

The lithium-containing composite oxide of the present invention is excellent in the discharge capacity per unit weight, the rate retention and the cycle durability and is further very excellent in the low temperature output characteristics and is thereby suitably used for a lithium ion secondary battery.

The entire disclosures of Japanese Patent Application No. 2014-132890 filed on Jun. 27, 2014 and Japanese Patent Application No. 2015-072458 filed on Mar. 31, 2015 including specifications, claims, drawings and summaries are incorporated herein by reference in their entireties.

What is claimed is:

1. A lithium-containing composite oxide, which is a compound represented by Formula 1:

$$Li_pNi_xCo_yMn_zMe_qO_rF_s \qquad \text{Formula 1}$$

wherein $1.01 \leq p \leq 1.1$, $0.414 \leq x \leq 0.5$, $0.24 \leq y \leq 0.35$, $0.17 \leq z \leq 0.25$, $0 \leq q \leq 0.01$, $0.9 \leq x+y+z+q \leq 1.05$, $1.9 \leq r \leq 2.1$, $0 \leq s \leq 0.03$, and Me is at least one member selected from the group consisting of Mg, Ca, Sr, Ba, Al and Zr, which has a crystal structure with space group R-3m, with a c-axis lattice constant being from 14.208 to 14.228 Å, and with an a-axis lattice constant and the c-axis lattice constant satisfying the relation of $3a+5.615 \leq c \leq 3a+5.655$, and of which the integrated intensity ratio ($I_{003}/I_{104}$) of the (003) peak to the (104) peak in an XRD pattern is from 1.21 to 1.39.

2. The lithium-containing composite oxide according to claim 1, wherein the (110) crystallite size in an XRD pattern is from 400 to 760 Å.

3. The lithium-containing composite oxide according to claim 1, wherein the average particle size $D_{50}$ is from 0.1 to 30 μm.

4. The lithium-containing composite oxide according to claim 1, wherein the following R-factor is from 0.37 to 0.44:

R-factor: a value calculated in accordance with the Formula 2 from the integrated intensities ($I_{102}$, $I_{006}$ and $I_{101}$) of the (102), (006) and (101) peaks in an XRD pattern:

$$R\text{-factor}=(I_{102}+I_{006})/I_{101} \qquad \text{Formula 2.}$$

5. The lithium-containing composite oxide according to claim 1, wherein the (003) crystallite size in an XRD pattern is from 700 to 1,200 Å.

6. A process for producing the lithium-containing composite oxide as defined in claim 1, which comprises mixing a composite compound comprising Ni, Co and Mn with a lithium compound, and firing the obtained mixture in an oxygen-containing atmosphere.

7. The process for producing the lithium-containing composite oxide according to claim 6, wherein the composite compound is a hydroxide comprising Ni, Co and Mn, and the (100) crystallite size of the hydroxide in an XRD pattern is from 130 to 300 Å.

8. A positive electrode, which comprises the lithium-containing composite oxide according to claim 1, a binder and an electrically conductive material.

9. A lithium ion secondary battery, which comprises the positive electrode according to claim 8, a separator, a negative electrode and a non-aqueous electrolyte.

* * * * *